Patented Sept. 3, 1929.

1,726,647

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

SUBSTITUTED DITHIOCARBAMATES AND METHOD OF MAKING SAME.

No Drawing.   Application filed March 2, 1928.  Serial No. 258,673.

This invention relates to new chemical substances, phenyl methylene bis disubstituted dithiocarbamates, and to a method of making them.

One of these compounds, phenyl methylene bis dimethyl dithiocarbamate may be prepared in the following manner and is believed to have the formula:

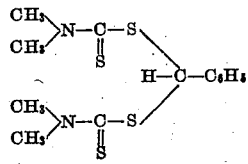

An aqueous solution of 143 grams of sodium dimethyl dithiocarbamate (the solution being approximately 33% concentration) is mixed with 2 volumes of 95% alcohol. To the solution are then added 161 grams of benzal chloride. The benzal chloride is soluble in diluted alcohol at a temperature of 50—60° C. The mixture is heated to the boiling point of the dilute alcohol for about 3 hours, within which time the benzal chloride will have almost completely disappeared. The reaction mixture is then cooled to room temperature, and the product, phenyl methylene bis dimethyl dithiocarbamate crystallizes almost completely from the solution. The crystals are filtered out, washed free from sodium chloride, recrystallized if desired or if necessary, and then dried. The product is a white crystalline solid melting at 180–182° C. (uncorrected). It is insoluble in water, slightly soluble in cold alcohol and soluble in hot alcohol. The name phenyl methylene bis dimethyl dithiocarbamate is preferred instead of benzal bis dimethyl dithiocarbamate, but it is understood that the compound is the same with either name.

The phenyl methylene bis diethyl dithiocarbamate may be prepared in the same manner by substituting a molecular weight (171 g.) of sodium diethyl dithiocarbamate in the above procedure. The phenyl methylene bis diethyl dithiocarbamate melts at 110° C. (uncorrected) and has the same properties of solubility as the dimethyl derivative.

Both of these products may be used to accelerate the vulcanization of rubber.

Having thus described my invention, what I claim and desire to protect by Letters Patent is:

1. As new compounds the phenyl methylene bis dialkyl dithiocarbamates.

2. As new compounds phenyl methylene bis dimethyl dithiocarbamates.

3. A method of making phenyl methylene bis dialkyl dithiocarbamates which comprises treating a solution of a dialkyl dithiocarbamate salt with benzal chloride, heating until the benzal chloride has substantially disappeared, cooling and separating the phenyl methylene bis dialkyl dithiocarbamate from the reaction mixture.

4. A method of making phenyl methylene bis dimethyl dithiocarbamate which comprises treating a solution of a dimethyl dithiocarbamate salt with benzal chloride, heating until the benzal chloride has substantially disappeared, cooling and separating the phenyl methylene bis dimethyl dithiocarbamate from the reaction mixture.

Signed at New York, county and State of New York, this 23rd day of February, 1928.

SIDNEY M. CADWELL.